(12) United States Patent
Yaakoby

(10) Patent No.: US 9,995,212 B2
(45) Date of Patent: Jun. 12, 2018

(54) FREE PISTON ENGINE

(71) Applicant: Shaul Yaakoby, Rishon Le Zion (IL)

(72) Inventor: Shaul Yaakoby, Rishon Le Zion (IL)

(73) Assignee: Aquarius Engines (A.M.) Ltd., Rosh Haayin (IL)

(*) Notice: Subject to any disclaimer, the term of this patent is extended or adjusted under 35 U.S.C. 154(b) by 0 days. days.

(21) Appl. No.: 15/306,238

(22) PCT Filed: Apr. 22, 2015

(86) PCT No.: PCT/IL2015/050425
§ 371 (c)(1),
(2) Date: Oct. 24, 2016

(87) PCT Pub. No.: WO2015/162614
PCT Pub. Date: Oct. 29, 2015

(65) Prior Publication Data
US 2017/0044975 A1 Feb. 16, 2017

Related U.S. Application Data

(60) Provisional application No. 61/983,469, filed on Apr. 24, 2014.

(51) Int. Cl.
*F02B 71/00* (2006.01)
*F01L 21/02* (2006.01)
*F01B 11/00* (2006.01)

(52) U.S. Cl.
CPC .......... *F02B 71/00* (2013.01); *F01B 11/001* (2013.01); *F01L 21/02* (2013.01)

(58) Field of Classification Search
CPC .......... F02B 71/00; F02B 71/02; F02B 71/04; F01B 11/00; F01B 11/001; F01B 11/002;
(Continued)

(56) References Cited

U.S. PATENT DOCUMENTS

| 1,040,472 A | 10/1912 | Wade |
| 1,707,035 A | 3/1929 | Wuerfel |

(Continued)

FOREIGN PATENT DOCUMENTS

| DE | 3518982 A | 11/1986 |
| DE | 102008004879 A1 | 7/2009 |

(Continued)

OTHER PUBLICATIONS

International Search Report and Written Opinion dated Aug. 9, 2015, in International Application No. PCT/IL2015/050425 (9 pgs.).

(Continued)

*Primary Examiner* — Jacob Amick
(74) *Attorney, Agent, or Firm* — Finnegan, Henderson, Farabow, Garrett & Dunner LLP

(57) ABSTRACT

An internal combustion engine for providing a linear reciprocating movement of an output shaft along a longitudinal axis. The engine has a double sided cylinder that is bounded by an engine head at each side of the cylinder. An exhaust unit is positioned at each side of the cylinder. A piston is positioned within a cylinder inner space and freely slides with respect to the cylinder along the longitudinal axis. Two piston rods are aligned with the longitudinal axis. Each piston rod is connected at a different side of the piston. Each of the piston rods has exhaust openings.

19 Claims, 19 Drawing Sheets

(58) Field of Classification Search
CPC ... F01B 11/003; F01B 2011/005; F01B 11/06; F01L 21/00; F01L 21/02; F01L 21/04
See application file for complete search history.

(56) References Cited

U.S. PATENT DOCUMENTS

| | | | |
|---|---|---|---|
| 1,720,504 A | | 7/1929 | Williams et al. |
| 1,755,673 A | | 4/1930 | Solenberger |
| 1,764,815 A | | 6/1930 | Williams |
| 1,796,882 A | | 3/1931 | Bowers |
| 2,187,979 A | | 1/1940 | Malpas |
| 2,392,052 A | | 1/1946 | Matheisel |
| 2,399,683 A | | 5/1946 | Loeb |
| 2,407,790 A | | 9/1946 | Le Tourneau |
| 2,831,738 A | | 4/1958 | Marien |
| 2,874,012 A | | 2/1959 | Stern |
| 3,146,940 A | | 9/1964 | McCrory et al. |
| 3,358,656 A | | 12/1967 | Panhard |
| 3,365,879 A | | 1/1968 | Panhard |
| 3,369,733 A | | 2/1968 | Campbell |
| 3,465,161 A | | 9/1969 | Cutkosky |
| 3,797,466 A | * | 3/1974 | Nambu .................. F02B 23/10 123/193.6 |
| 3,914,574 A | | 10/1975 | Hill et al. |
| 4,156,410 A | | 5/1979 | Ramsey |
| 4,385,597 A | | 5/1983 | Stelzer |
| 4,414,927 A | | 11/1983 | Simon |
| 4,665,703 A | | 5/1987 | Constant |
| 4,803,960 A | | 2/1989 | Köppen |
| 4,831,972 A | | 5/1989 | Barnwell |
| 5,285,752 A | | 2/1994 | Reed et al. |
| 5,351,659 A | * | 10/1994 | Chao ...................... F02B 43/00 123/61 R |
| 5,676,097 A | | 10/1997 | Montresor |
| 5,816,202 A | | 10/1998 | Montresor |
| 6,065,438 A | | 5/2000 | Kiesel |
| 6,199,519 B1 | | 3/2001 | Van Blarigan |
| 6,240,828 B1 | | 6/2001 | Fujimoto |
| 6,467,397 B1 | | 10/2002 | Fuchs et al. |
| 6,722,322 B2 | | 4/2004 | Tse |
| 6,948,459 B1 | | 9/2005 | Laumen et al. |
| 7,032,548 B2 | | 4/2006 | Tusinean |
| 7,194,989 B2 | | 3/2007 | Hallenbeck |
| 7,207,299 B2 | | 4/2007 | Hofbauer |
| 7,412,949 B2 | | 8/2008 | Cillessen et al. |
| 9,010,287 B2 | | 4/2015 | Morreim |
| 9,206,900 B2 | | 12/2015 | Smith et al. |
| 2005/0284426 A1 | | 12/2005 | Tusinean |
| 2006/0157003 A1 | | 7/2006 | Lemke et al. |
| 2011/0239642 A1 | | 10/2011 | Schwiesow et al. |
| 2012/0266842 A1 | | 10/2012 | Cockerill |
| 2012/0280513 A1 | | 11/2012 | Cockerill |
| 2013/0276740 A1 | | 10/2013 | Wandrie et al. |
| 2013/0298874 A1 | | 11/2013 | Sun et al. |
| 2014/0116389 A1 | | 5/2014 | Khurgin |
| 2015/0114352 A1 | | 4/2015 | McAlister et al. |

FOREIGN PATENT DOCUMENTS

| | | |
|---|---|---|
| GB | 602310 A | 5/1948 |
| GB | 2183726 A | 6/1987 |
| GB | 2353562 A | 2/2001 |
| JP | 63-192916 | 10/1988 |

OTHER PUBLICATIONS

Jan Ridders, "Dual 2stroke model engine," available at URL: https://www.youtube.com/watch?v=gl.wHEUJ752s, uploaded May 22, 2013.

* cited by examiner

FREE PISTON ENGINE

CLAIM FOR PRIORITY

This application is a U.S. national phase entry under 35 U.S.C. § 371 from PCT International Application No. PCT/IL2015/050425, filed Apr. 22, 2015, which claims the benefit of priority of U.S. Provisional Patent Application No. 61/983,469, filed Apr. 24, 2014, to both of which this application claims the benefit of priority, and the entirety of the subject matter of both of which is incorporated by reference.

FIELD OF THE INVENTION

The present invention relates to the field of internal combustion engines, and more particularly to the field of internal combustion engines having a free end piston.

BACKGROUND OF THE INVENTION

Internal combustion engines are known. The most common types of piston engines are two-stroke engines and four-stroke engines. These types of engines consist a relatively large number of parts, and require a numerous number of auxiliary systems, e.g., oiling, cooling and the like, for proper functioning.

GB2183726(A) discloses a double-action two-stroke internal combustion engine. The engine is provided with an exhaust valve that moves on and with respect to the piston rod and does not form an integral portion thereof. The exhaust valve is rearwardly tensioned by a spring and opens by a tenon when the piston moves to the other side. The exhaust takes place when the piston reaches the other side, and the exhaust valve closes as soon as the piston starts moving to the other side.

The disadvantages of '726 are; the need to produce the exhaust valve slidingly matching to the piston rod, the necessity to provide a spring and a mechanical opening mechanism to the valve, and, the inefficient gas exchange process.

U.S. Pat. No. 5,676,097(A) discloses a high-efficiency internal combustion engine provided with a double-acting piston cooperating with auxiliary feed inlet units. The exhaust opening is located at the center of the cylinder, and the inlet openings are located at the edges of the cylinder and use a valve (19).

US2012280513(A1) discloses a free piston engine. The engine is very long. A piston, located at each side of the engine is connected by means of an internal rod to the other piston. The engine contains liquid therein and the exhaust is carried out by means of a mechanical valve located at each side of the engine. The mechanical power is not received outside the engine but within the engine.

The '513 application suffers from the disadvantage that it requires a dedicated exhaust valve and a mechanism for operation thereof.

U.S. Pat. No. 4,831,972(A) discloses an internal combustion engine having the spark plugs located at a center thereof. The mechanical power received by the engine remains within the engine.

U.S. Pat. No. 6,722,322(B2) discloses an internal combustion engine comprising two pistons that form a kind of an engine head. An external spring serves to hold an internal plunger.

DE102008004879(A1) discloses a free piston engine, for example, for an excavator, that has a heat engine with free pistons, linear generator driven by the heat engine for generating electrical energy, and pump assembly driven by the heat engine for generating hydraulic and/or pneumatic energy.

U.S. Pat. No. 6,199,519(B1) discloses a free piston engine which is self-ignited without the need of spark plugs. No power is going out from the engine and the inlet and exhaust are provided at both sides of the cylinder side.

U.S. Pat. No. 4,385,597(A) discloses a two-stroke internal combustion engine having three pistons; one central piston and two side pistons moving with respect to the central piston.

U.S. Pat. No. 4,414,927(A) discloses a two-stroke oscillating piston engine having three pistons. Neither of the piston rods serve as an exhaust valve.

JP563192916(A) discloses a linear engine having three pistons.

GB2353562(A) discloses an internal combustion engine with a rigid piston/connecting rod unit and two combustion chambers, also with thermal insulation and water spray into the combustion chambers. A disadvantage of the engine of '562 is that it requires inlet and exhaust valves at each side of the engine.

It is the object of the present invention to provide a free piston engine that significantly reduces or overcomes the aforementioned disadvantages.

It is a major object of the present invention to provide a new method of gas exchange in an internal combustion engine.

It is a further major object of the present invention to provide a free piston engine that enables constant flow of pre-charged fresh air into and through the cylinder and through the piston rod regardless the position of the piston, and, through the exhaust system, irrespective of the combustion action taken at a given time.

It is a further object of the present invention to provide a new cycle process in an internal combustion engine which differs from an Auto cycle, Atkinson cycle, or two stroke cycle.

It is still another object of the present invention to provide a multifunctional piston.

It is yet another object of the present invention to provide a piston that functions as an inlet valve, and, a piston rod that functions as an exhaust tube and as an exhaust valve.

It is still a further object of the present invention to provide a free piston engine embodying direct low-pressure fuel injection.

It is yet another object of the present invention to provide a free piston engine embodying a traverse stressless action piston.

It is a further object of the present invention to provide a free piston engine which prevents compressed gas leakage by diverting the flow of gases to a longer path and reducing the convergence of gases toward the gap between the engine head and the piston rod.

It is still a further object of the present invention to provide a free piston engine having a piston rotation prevention mechanism.

It is still yet another object of the present invention to provide a free piston engine having a split sealing ring rotation prevention system.

It is also another object of the present invention to provide a free piston engine having electric generators at its perimeter.

It is still another object of the present invention to provide a free piston engine that transforms linear movement to rotational movement.

It is yet another object of the present invention to provide a low cost free piston engine.

It is a further object of the present invention to provide a new internal combustion engine that is efficient, have a small number of parts, have a high power to weight ratio, and significantly reduces air pollution and fuel consumption.

SUMMARY OF THE INVENTION

A known auto cycle process comprises the following steps: Intake—Compression—Work—Exhaust. A known two-stroke cycle process comprises the following steps: Work & compression—exhaust & intake along the piston move from a top point of the cylinder to the bottom point of the cylinder and up again (complete cycle).

The cycle process of the present invention, which may be called an "Aquarius cycle", comprises the following steps: Work—exhaust—scavenging—gas boost—compression—work. The present invention suggests this new cycle and the present design allows it to take place symmetrically and simultaneously (i.e., when a given first side of the cylinder goes under a given step of the cycle, the opposite side of the cylinder goes also under a step of the cycle, however, under a different step comparing to the step occurring at the first side of the cylinder) inside the cylinder on both sides of the cylinder. The entire cycle takes place inside the cylinder every time the piston completes its stroke from one end of the cylinder to the other end and simultaneously.

A continuous flow of pre-charged air through the cylinder serves, beside of being used for combustion, also for burned gas scavenging, for cooling the cylinder wall and the piston, and for enriching the burned gases of the exhaust chamber.

In accordance with the present invention there is provided an internal combustion engine for generating a linear reciprocating movement of an output shaft along a longitudinal axis, the engine comprises:
- a double sided cylinder, the cylinder bounded by an engine head at each side thereof;
- an exhaust unit positioned at each side of the cylinder;
- a piston positioned within a cylinder inner space and freely sliding with respect to the cylinder along the longitudinal axis;
- two piston rods aligned with the longitudinal axis, each piston rod connected at a different side of the piston, wherein:
- each of the piston rods comprises exhaust openings.

Preferably, the exhaust openings comprising at least one from the group of: holes, longitudinal slots, and grooves.

Typically, each of the piston rods is provided with a cavity extending at least from an open end of the piston rod, which is remote from the piston, to an exhaust opening that is closest to the piston.

Advantageously, the exhaust openings constitute exhaust valves that form an integral part of the piston rods.

Further advantageously, each of the piston rods constitutes a sliding valve.

Still further advantageously, the piston constitutes an inlet valve and an exhaust valve.

Typically, the piston is symmetrical with respect to a median plane thereof.

Innovatively, the engine operates through an Aquarius cycle, the Aquarius cycle comprising the steps of:
(a) work, (b) exhaust, (c) scavenging, (d) gas boost, (e) compression.

Preferably, the exhaust openings are arranged in at least one group.

Typically, the exhaust openings are arranged in a multitude of groups.

If desired, the cylinder comprises inlet openings at a central portion thereof.

Practically, the cylinder comprises a continuous flow of pre-charged air therethrough.

Advantageously, the cylinder comprises a cylinder wall at an inner portion thereof, and, the continuous flow of air scavenges the cylinder from burned gases, cools the cylinder wall and the piston, and enriches the burned gases without depending on the position of the piston.

Innovatively, the burned gases exhaust the cylinder through the piston rod.

Advantageously, the burned gases exit the cylinder at the end of an efficient work stroke.

Typically, the piston constitutes a multifunctional piston.

Advantageously, the piston constitutes a traverse stressless action piston.

If desired, the engine comprises a transient chamber connected to the exhaust manifold for prevention of burned gas leakage.

Typically, the engine comprises sealing rings for sealing between the piston rod and the engine head and between the piston rod and the exhaust unit, and wherein:
- the sealing rings are stationary and the piston rod slides therein and with respect thereto.

Further typically, the sealing rings comprise split rings that tend to close inwardly against the piston rod.

In some embodiments, the engine comprises intake openings and the exhaust openings are near the intake openings.

If desired, the engine comprises an aligner system for preventing rotation of the piston around the longitudinal axis.

Practically, the aligner system comprises aligner rods that are directed parallel to the longitudinal axis and are connected to the piston rod through connecting arms.

Advantageously, the aligner rods comprise coil windings, and
- the engine comprises an electric motor that generates electric power by means of stator coils that are energized by a linear back and forth movement of the aligner rods therethrough.

Typically, the engine comprises an imaginary peripheral envelope which is around and distanced away from the longitudinal axis; and
- the stator coils of the electric motor are positioned around the peripheral envelope and distanced from the longitudinal axis.

Further advantageously, the engine comprises a system for transforming linear movement to rotational movement.

In some embodiments, the system comprises:
- a first pinion rotated by a first rack that is connected to a first aligner rod, the first pinion is rotated to a single direction;
- a second pinion rotated by a second rack that is connected to a second aligner rod that is adjacent the first aligner rod, the second pinion is rotated to a single direction that is the same as the rotation direction of the first pinion; and
- the first pinion and the second pinion are aligned and rotate around an output axis.

BRIEF DESCRIPTION OF THE DRAWINGS

For a better understanding of the present invention and to show how the same may be carried out in practice, reference will now be made to the accompanying drawings, in which.

DESCRIPTION OF PREFERRED EMBODIMENTS

Figure 1:
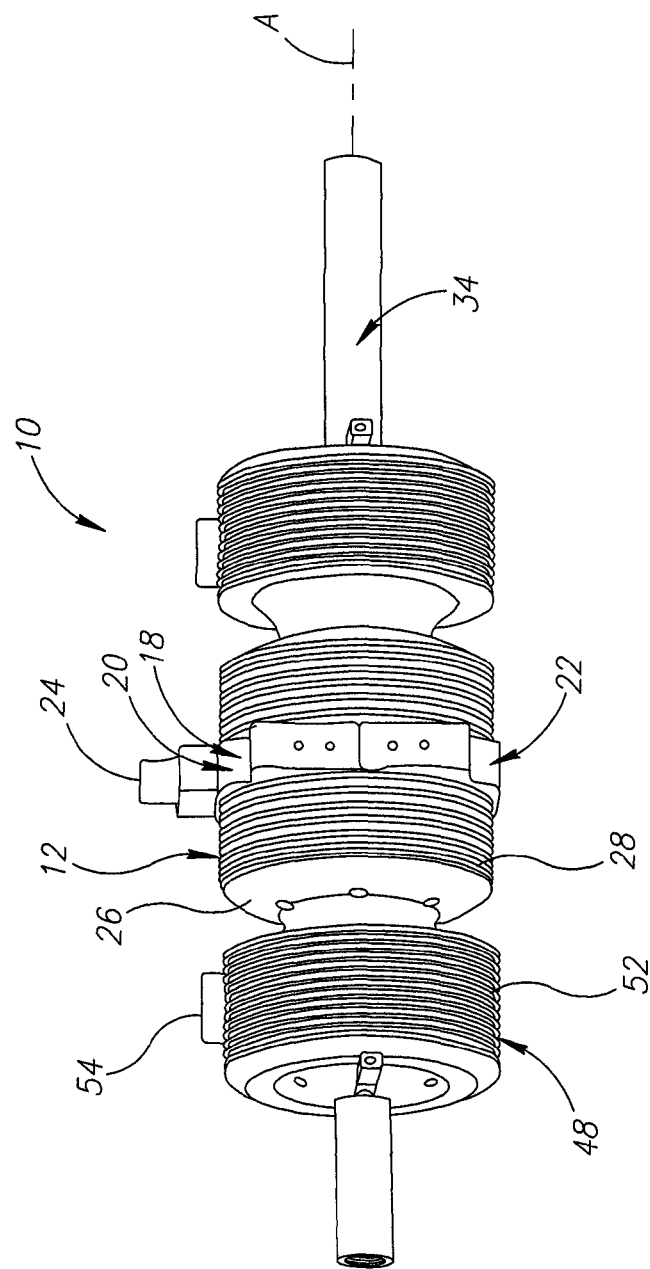
FIG. 1 is a perspective view of a free piston engine according to the present invention.
Figure 2:
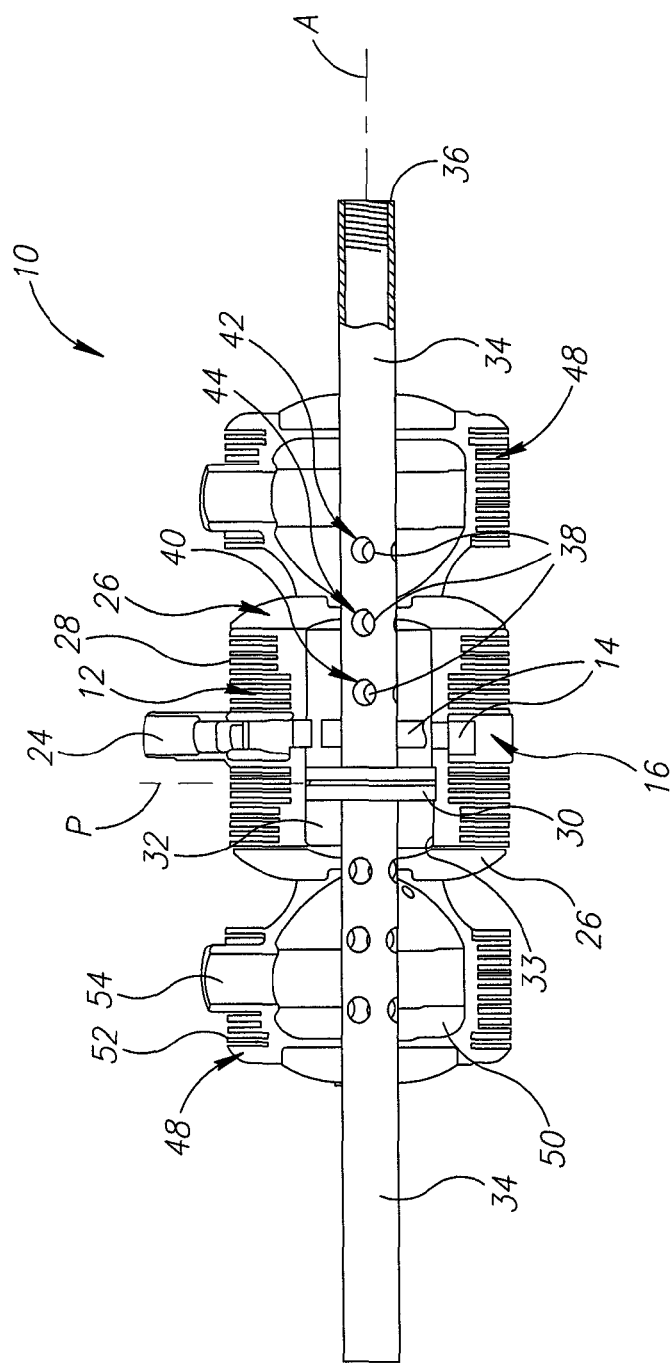
FIG. 2 is a side cross-sectional view of the engine of FIG. 1, according to a first embodiment.
Figure 3:
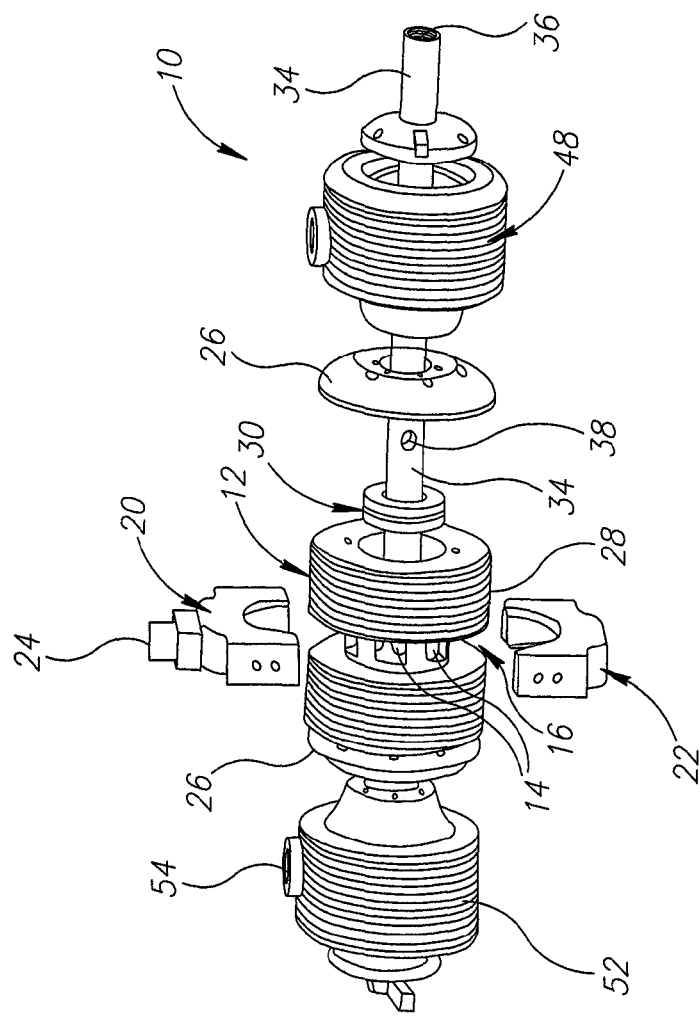
FIG. 3 is a perspective exploded view of the engine of FIG. 1.
Figure 4:
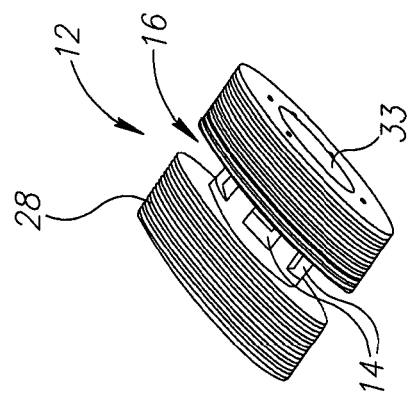
FIG. 4 is a perspective view of the cylinder of the engine of FIG. 1.
Figure 5:
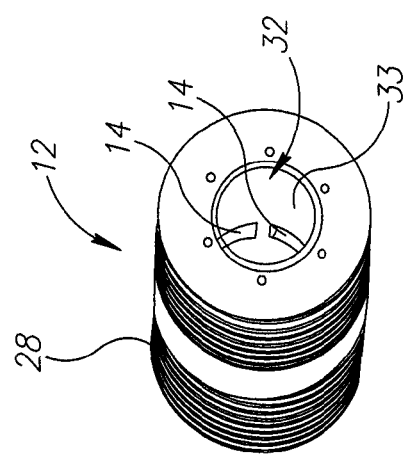
FIG. 5 is a top perspective view of the cylinder of FIG. 4.
Figure 6:
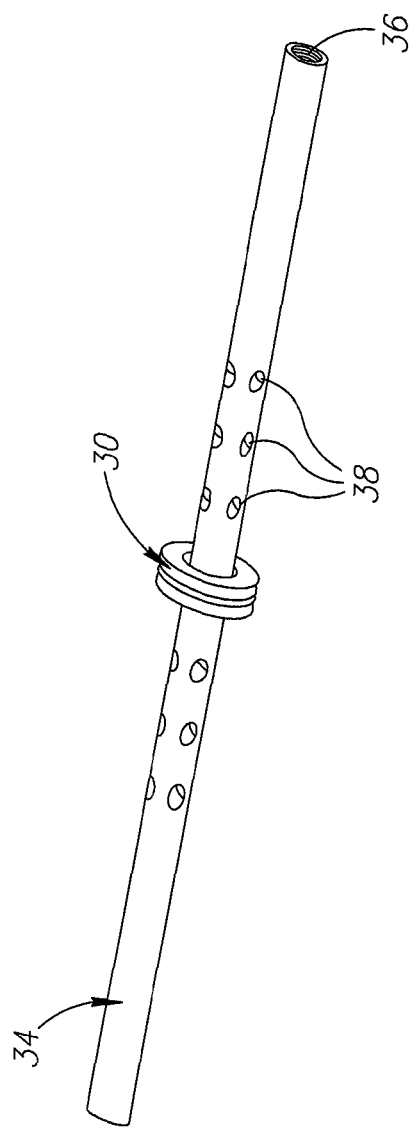
FIG. 6 is a perspective view of the piston and piston rods of the engine of FIG. 1.

Attention is first drawn to FIGS. 1 to 10 that show a free piston engine 10 according to the present invention. The free piston engine 10, having a longitudinal axis A, is an internal combustion engine. For a matter of simplicity, the free piston engine 10 will hereinafter be called "engine".

The engine 10 comprises a two-sided cylinder 12 having a plurality of peripherally distributed inlet openings 14 in a central portion 16 of the cylinder 12. Typically, the inlet openings 14 are evenly distributed around the periphery of the cylinder 12. The inlet openings 14 are peripherally bounded by an intake manifold 18. The intake manifold 18 comprises an intake manifold upper portion 20 that is connected to an intake manifold lower portion 22. The intake manifold upper portion 20 comprises, at an upper portion thereof, an air intake 24 through which pre-charged fresh air gets into the cylinder 12. Each side of the cylinder 12 is closed by an engine head 26 and is provided with a plurality of spaced-apart disc-like cooling fins 28. In some cases, according to design needs, the engine 10 may be cooled by using coolant of a type known in the art.

It should be noted that directional terms appearing throughout the specification and claims, e.g. "forward", "rear", "upper", "lower" etc., are used as terms of convenience to distinguish the location of various surfaces relative to each other. These terms are defined with reference to the figures, however, they are used for illustrative purposes only, and are not intended to limit the scope of the appended claims.

A piston 30 is located within a cylinder inner space 32 of the cylinder 12 and can freely slide back and forth along the cylinder inner space 32, in the direction of the longitudinal axis A. The piston 30 is double-sided, solid, and symmetrical with respect to a median plane P thereof.

A piston rod 34 is connected to each side of the piston 30, at a center thereof, symmetrically with respect to the longitudinal axis A. Each of the two piston rods 34 is hollow, i.e., comprises a longitudinally extending cavity 36 that extends along the entire length of the piston rod 34. Since the piston 30 is solid, as was mentioned above, it should be clear that the cavity 36 of a given piston rod 34 is not connected to the cavity 36 of the other piston rod 34, and no gas can flow through the piston 30 from one side thereof to the other side thereof.

Each piston rod 34, comprising an integral part of a "sliding valve" (as will be later described) and of the multi-functional piston, is provided with a plurality of exhaust openings 38. According to a specific embodiment of the present invention, the exhaust openings 38 of each piston rod 34 are arranged in three groups, namely, an inward group 40, which is closest to the piston 30, an outward group 42, which is farthest from the piston 30, and, a central group 44, which is located between the inward group 40 and the outward group 42.

The distance between the exhaust openings groups and their location with respect to the piston, or, if desired, the number of groups are determined according to design needs. Each group, i.e., the inward group 40, the outward group 42 and the central group 44 are provided with a plurality of exhaust openings 38. The exhaust openings 38 of each group are equally distanced from the piston 30. Furthermore, according to a specific embodiment of the present invention, the exhaust openings 38 of a given group are equally peripherally distributed around the piston rod 34.

The distance of the exhaust openings 38 of the inward group 40 from the piston 30, measured from the nearest point of the exhaust openings 38 to the piston 30, determines the compression ratio of the engine 10.

Each of the engine heads 26 comprises a region for allocating therein a spark plug and a fuel atomizer 45. Alternatively, the fuel atomizer 45 may be applied at the central portion 16 of the cylinder or at a cylinder wall 33.

The distal end of each of the engine heads 26 is closed by an exhaust unit 48. The exhaust unit 48 is connected to each of the engine heads 26, or, can be combined with or be an integral part of each of the engine heads 26. Each exhaust unit 48 comprises an exhaust chamber 50, at an inner portion thereof, and, exhaust cooling fins 52, at an outer portion thereof. An upper portion of each of the exhausts 48 comprises an exhaust outlet 54.

A general description of the engine operation will now be described. When the piston 30 slides within the cylinder inner space 32 it closes and exposes, correspondingly, the inlet openings 14 through which enters the pre-charged air required for the entire engine operation, i.e., combustion, cooling, scavenging, and, oxidation of burned gases. According to preferred embodiments of the present invention, the air which enters the cylinder is pre-charged (by a system that is not shown). When the piston rods 34 move, they expose and close, correspondingly, to the exhaust chamber 50. In this position, the exhaust gases may flow out from the exhaust chamber 50 to the exhaust outlet 54. If it is required, the exhaust gases may further flow into a turbo-charging system (not shown).

Figure 20:
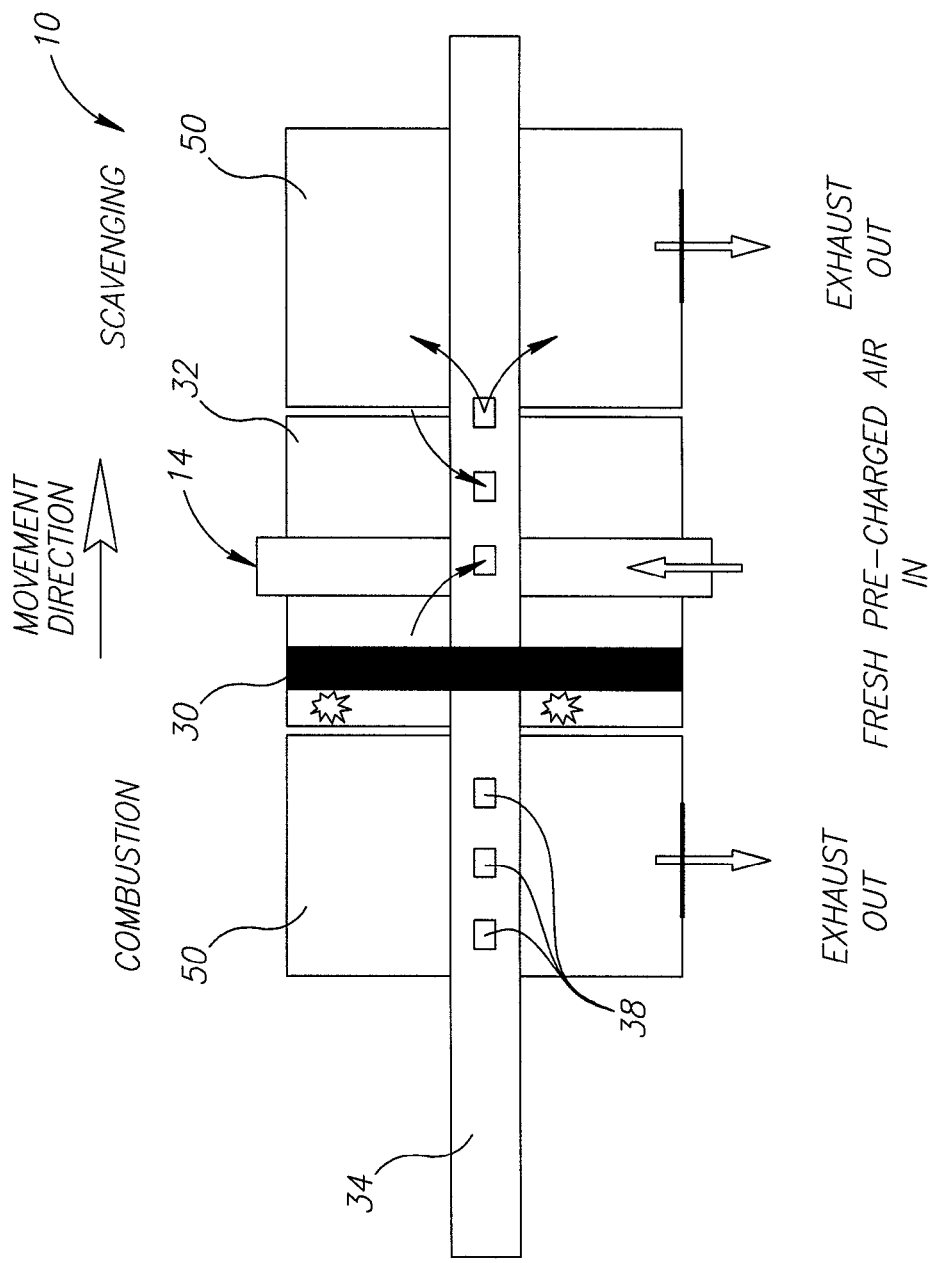
FIG. 20 is a schematical cross-sectional view of a free piston engine according to the present invention during a first step of an Aquarius cycle.
Figure 23:
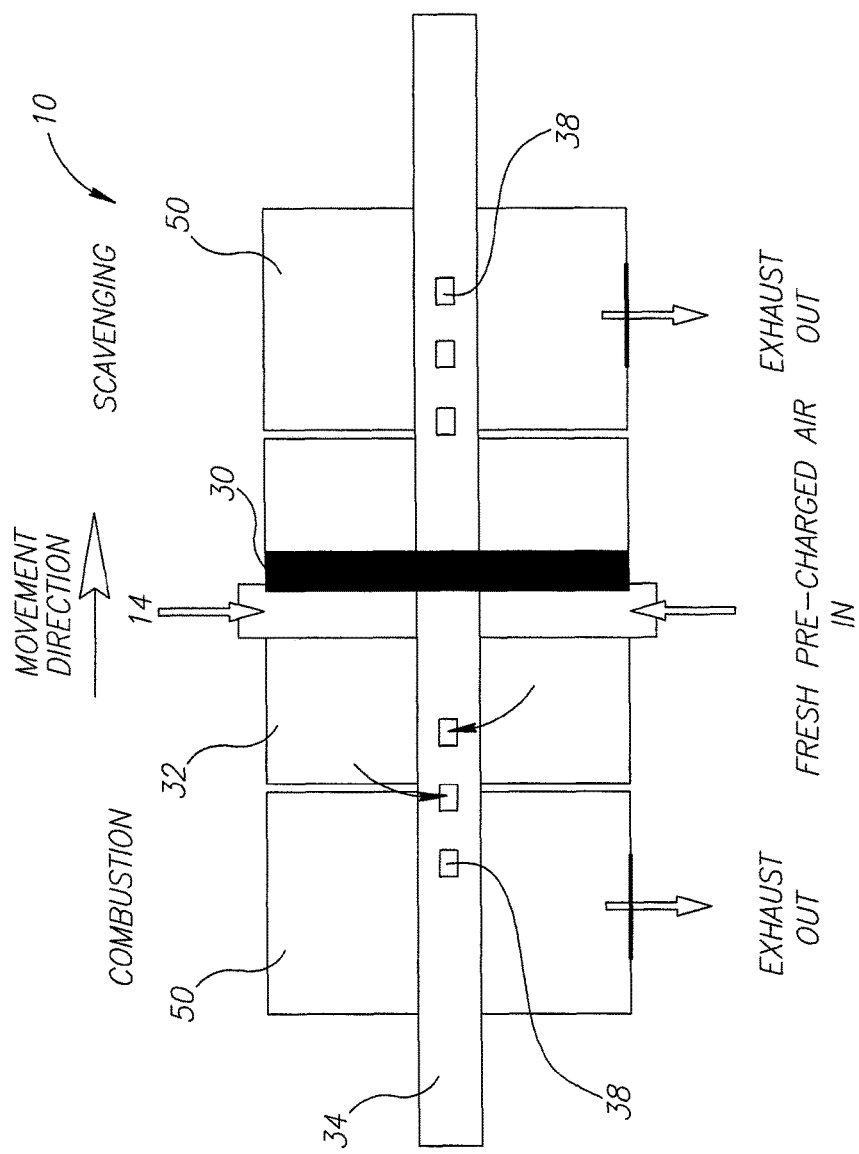
FIG. 23 is a schematical cross-sectional view of a free piston engine according to the present invention during a fourth step of an Aquarius cycle.

When the piston 30 moves from the central portion 16 of the cylinder 12 towards an engine head 26, the inlet openings 14 and the exhaust openings 38 are closed, and a compression stroke takes place (see FIG. 23, when the piston moves to the right side). Fuel is injected into the cylinder inner space 32, through an atomizer 45 (see FIG. 11), and is ignited by means of a spark plug 46 (see FIG. 20). The ignition of the fuel and air mixture creates a combustion that is known as a power stroke or work stroke (see FIG. 21).

It should be noted that the engine of the present invention utilizes a single center atomizer, instead of several atomizers used in conventional engines. Alternatively, the engine may use two atomizers, one on each engine head or near the top end of the cylinder wall 33.

In addition, fuel is injected through the atomizer in the beginning of the compression stroke, wherein, generally, in prior art engines, fuel is injected into a combustion chamber only at the end of the compression stroke. This feature enables the engine of the present invention to perform a "direct low pressure injection", i.e., enables to inject the fuel, into a chamber consisting air, at about 3 bar, instead of injecting the fuel, into a chamber consisting air, at about 100 bar or more. This direct low pressure injection, in contrary to the commonly used high pressure injection, encounters various advantages as can be appreciated by a person skilled in the art. For example, (1) safety—using low pressure considerably reduces the chance of a leak, (2) energy saving due to the need to inject the fuel at lower pressure, (3) better atomization of the air and fuel, leads to better combustion and lower fuel consumption, and, hence, reduced air pollution.

Figure 21:
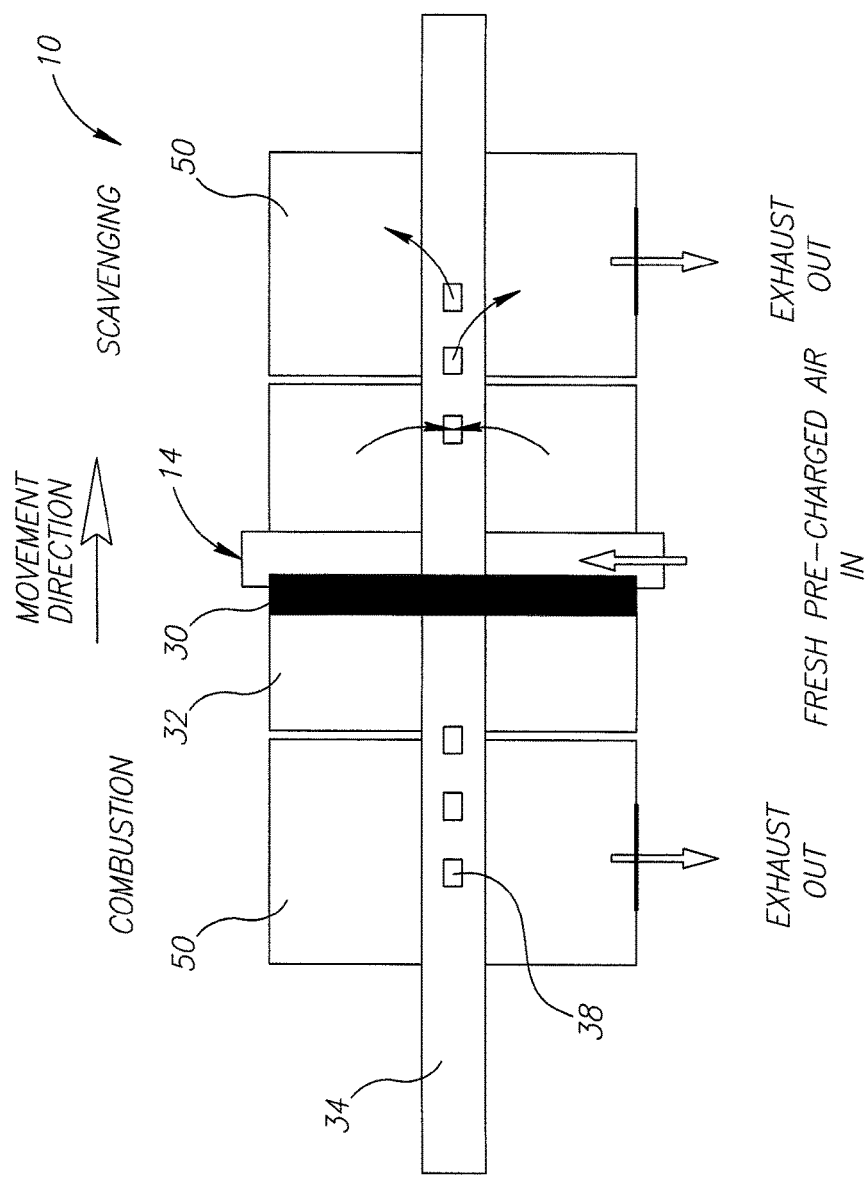
FIG. 21 is a schematical cross-sectional view of a free piston engine according to the present invention during a second step of an Aquarius cycle.
Figure 22:
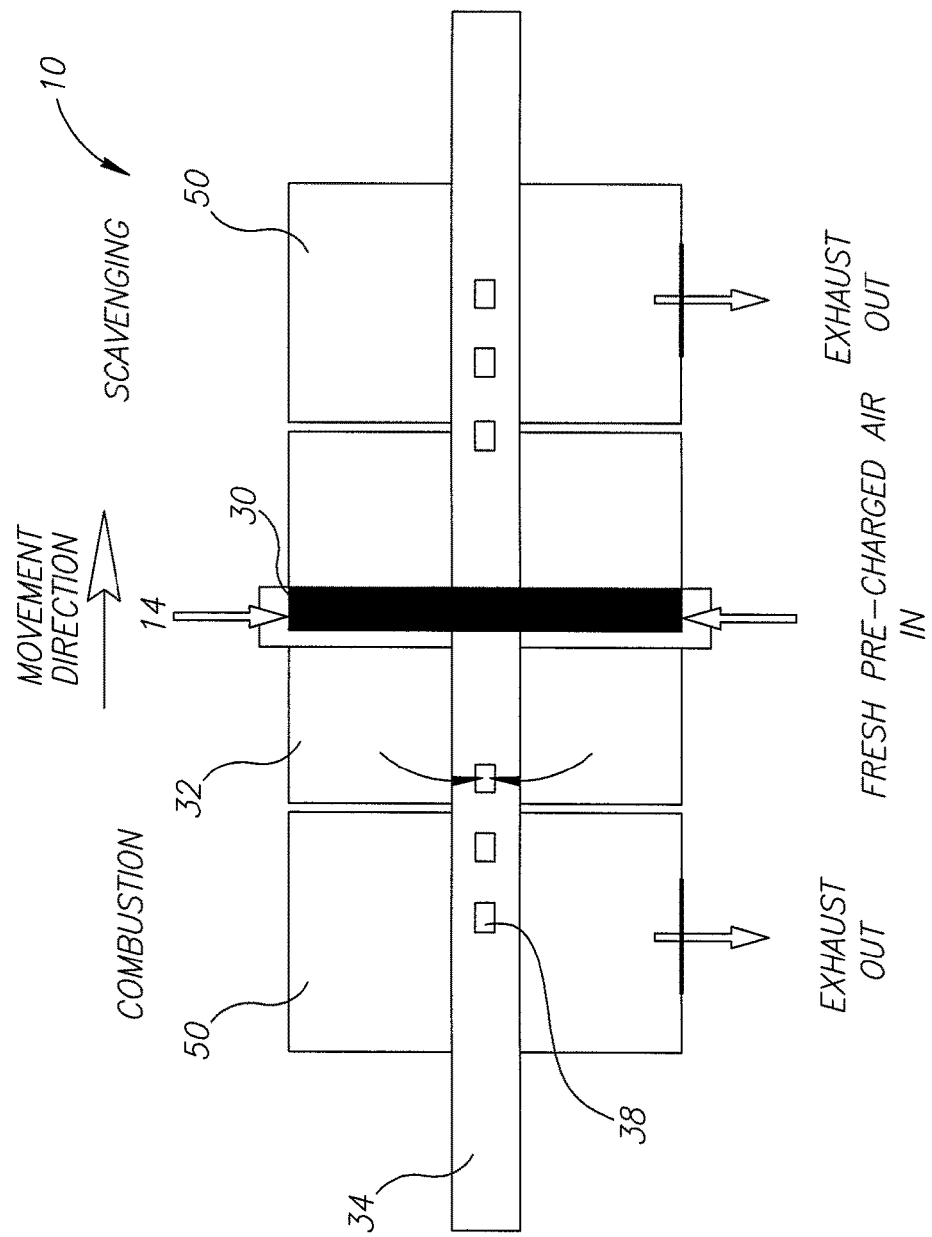
FIG. 22 is a schematical cross-sectional view of a free piston engine according to the present invention during a third step of an Aquarius cycle.

Now, during the work stroke, the piston 30 moves toward the opposite side of the cylinder 12 and moving therewith the piston rods 34. During the movement of the piston rods 34 (to the right side as seen in FIG. 21), the exhaust openings 38 (which are behind the piston, i.e., the exhaust openings which are on the left of the piston) are exposed to the cylinder inner space 32 and enable the burned gases to flow through the piston rod 34 toward the exhaust chamber 50 and to the exhaust outlet 54 (see the change from FIG. 21 to FIG. 22).

This unique and special action allows the burned gases to be discharged immediately after ending the efficient work stroke. The efficient work stroke is defined as the difference between the high pressure after the combustion, leading to an effective stroke (movement of the piston) and thereafter increase of the cylinder's free space causing to reduced pressure at that space, at which point the gas pressure is no longer effective but has transited to a kinetic force moving the piston. Thus, due to a relatively short time of presence of burned gases within the cylinder 12, the cylinder is kept relatively cold and the exhaust unit 48 hot.

During the continuation of the movement of the piston 30 the inlet openings 14 are exposed and pre-charged fresh air gets, through the air intake 24, to the cylinder inner space 32 that has just gone through a work stroke (see FIG. 23). The pre-charged air scavenges the cylinder's inner space 32 from any residues of burned gases, cools the cylinder from the inside and enriches the burned gases at the exhaust unit with fresh air so that any residues of un-burned fuel are burned. Another important issue is that as the piston 30 keeps moving toward the other end of the cylinder 12, the pre-charged air fills the growing size of the cylinder's free space, thus eliminating suction of the burned gases back into the cylinder.

Simultaneously, the air that was in the opposite side of the piston 30 is first boosted until the exhaust valve openings are closed, and then compressed, thus starting another compression stroke at the other side. The action of the exhaust openings that open, intermittently, to the cylinder inner space 32, and, to the exhaust chamber 50, and, also allows burned gases to flow from the cylinder inner space 32 to the exhaust chamber 50, may be defined as a "sliding valve" action.

It should be noted that when the piston 30 reaches its maximal stroke to the left (see FIG. 2) within the cylinder inner space 32, all the exhaust openings 38 of the left piston rod 34, i.e., the exhaust openings of the inward group 40, of the central group 44 and of the outward group 42, are located within the left exhaust chamber 50 and no exhaust openings 38 of the outward group 42 are exposed to the atmosphere at any case. In this position, the exhaust openings 38 of the outward group 42 of the other piston rod 34, i.e., the right piston rod 34, are positioned within the right exhaust chamber 50, while the exhaust openings 38 of the inward group 40 and of the central group 44 of the right piston rod 34 are positioned within the cylinder inner space 32.

Attention is now drawn to another embodiment of the present invention, shown in FIGS. 11-12, 15-16. As shown, the piston rod 34 is provided, instead of the round exhaust openings, with longitudinally extending exhaust slots 56. In the embodiment shown, the piston rod 34 is provided with four sets 58 of exhaust slots 56 at each side of the piston 30. In each set 58 of exhaust slots 56, each of the exhaust slots 56 is symmetrically arranged with respect to the longitudinal axis A and with respect to the exhaust slots 56 at the other side of the median plane P.

According to other embodiments of the present invention (not shown in the figures), a similar action of a "sliding valve" for the exhaust gases may be achieved by using a piston rod having different diameters along the length thereof. Thus, the piston rod has a full size diameter adjacent the piston and at the exhaust unit external end, and, a smaller diameter in between. With this construction, the exhaust gases can freely flow from the cylinder inner space 32 to the exhaust chamber 50 as the piston slides from one end to the other.

Furthermore, the piston rods 34 are connected to an aligner system 60 (see FIG. 16) for preventing rotation of the piston rods 34 around the longitudinal axis A, thus featuring an "aligned movement piston". Each of the piston rods 34 is connected, at a free end 62 thereof distal from the piston 30, to a connecting arm 64. The connection of the connecting arm 64 to the piston rod 34 is such that the connecting arm 64 cannot rotate with respect to the piston rod 34 around the longitudinal axis A. This is done, e.g., by threadingly engaging between the piston rod 34 and the connecting arm 64, or, by forming the free end 62 of the piston rod 34 as a protrusion with a non-round form, and, assembling thereon the connecting arm 64 having a corresponding non-round indentation. A securing bolt 66 securely attaches the connecting arm 64 to the corresponding piston rod 34.

An aligner rod 68, having a cylindrical shape and an aligner rod axis B, is perpendicularly connected at each end of the connecting arms 64. The aligner rods 68 are inwardly connected with respect to the engine 10, and are directed such that the aligner rod axis B is parallel to the longitudinal axis A.

Figure 11:
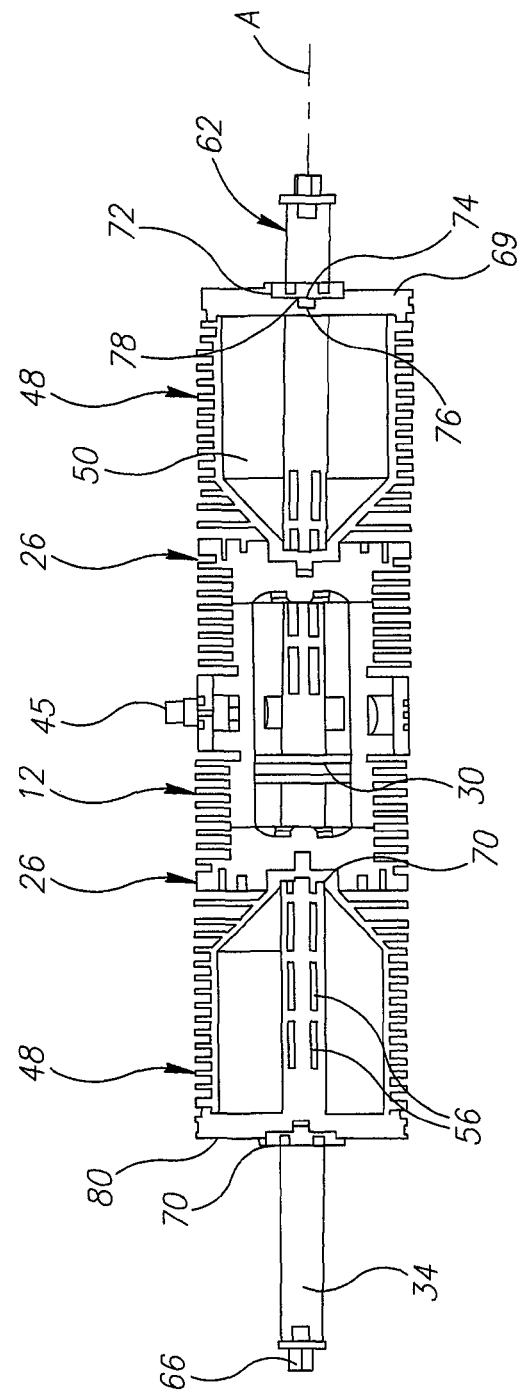
FIG. 11 is a cross-sectional side view of another embodiment of a free piston engine according to the present invention.
Figure 12:
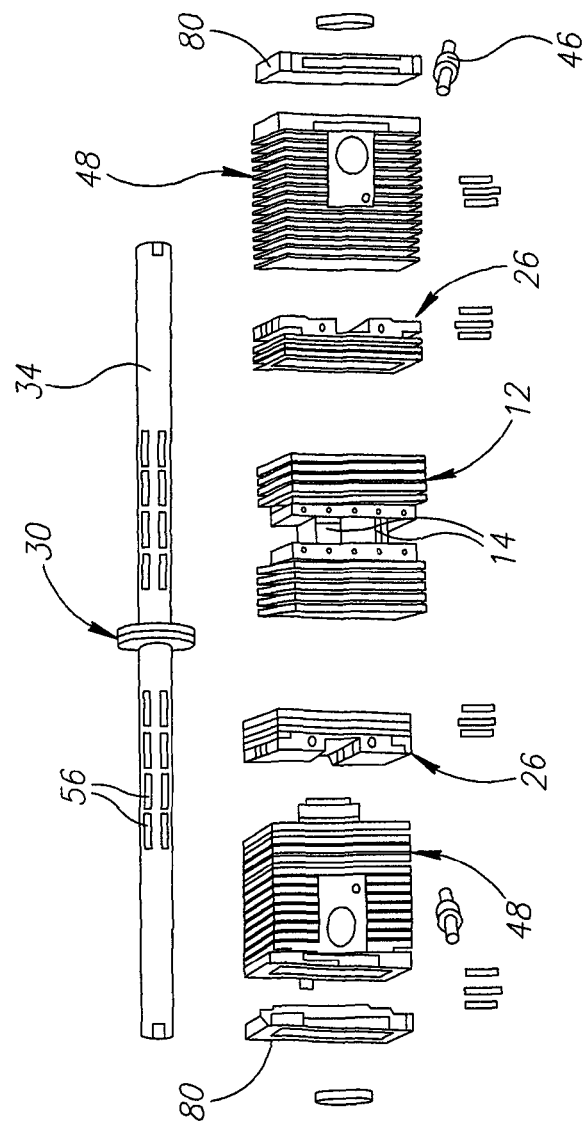
FIG. 12 is a perspective exploded view of the engine of FIG. 11.
Figure 14:
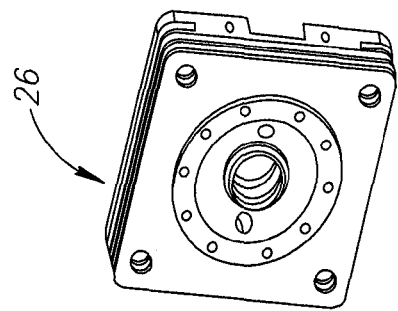
FIG. 14 is a perspective view of the engine head of the engine of FIG. 11.
Figure 13:
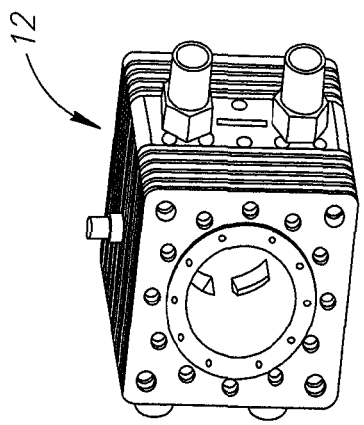
FIG. 13 is a perspective view of the cylinder of the engine of FIG. 11.
Figure 15:
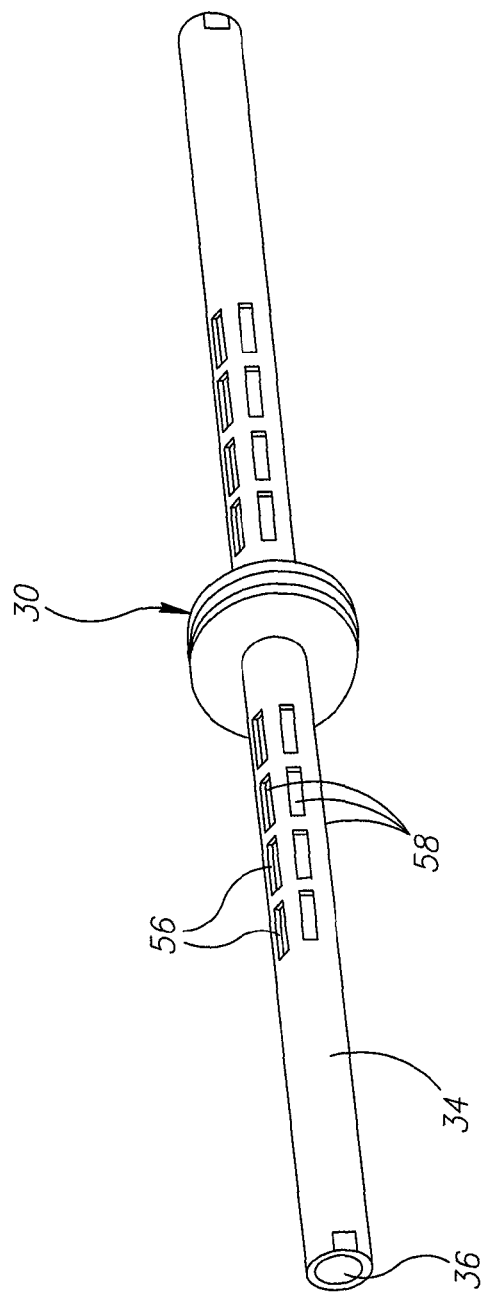
FIG. 15 is a perspective view of the piston and piston rods of the engine of FIG. 11.
Figure 16:
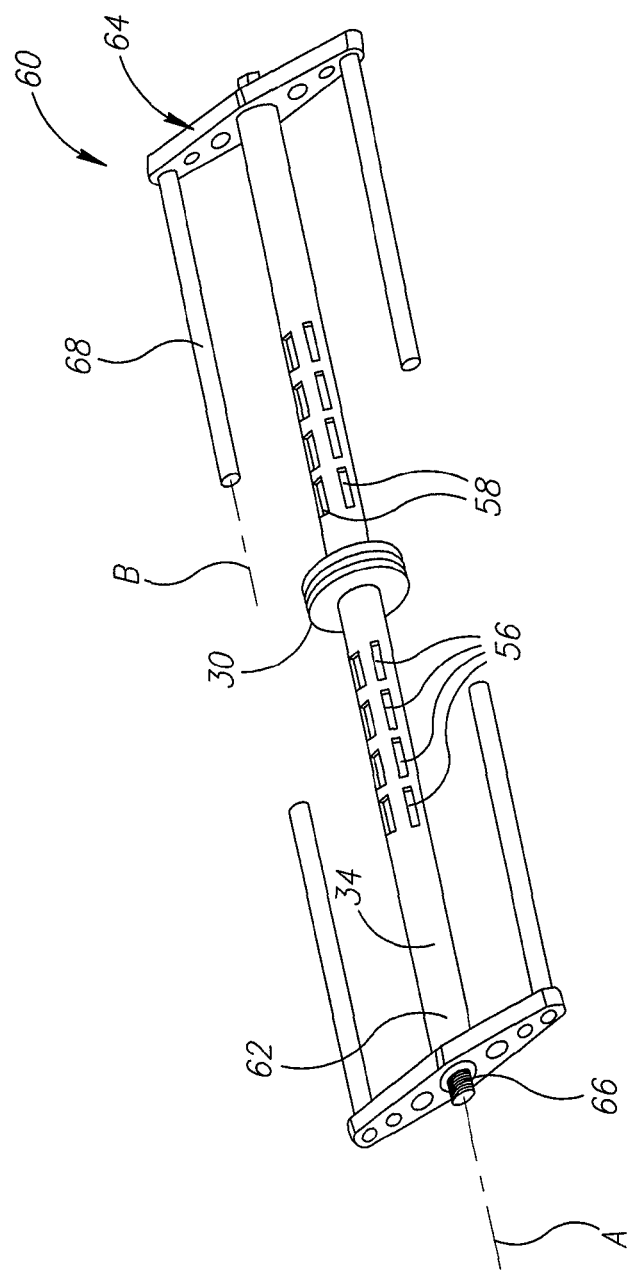
FIG. 16 is a perspective view of the piston alignment system of the engine of FIG. 11.

As shown in FIG. 11, each exhaust unit 48 is provided, outside of the exhaust chamber 50 thereof, with aligning bores 69 that correspond to the aligner rods 68 in size and location. Thus, when the engine 10 is assembled and each of the aligning rods 68 freely slides within its corresponding aligning bore 69, it is guaranteed that the piston 30 together with the piston rods 34 will move back and forth only along the longitudinal axis A, while rotation of the piston 30 and the piston rods 34 around the longitudinal axis A is successfully prevented.

In order to prevent gases from passing between the piston rod 34 and exhaust unit outer end to the atmosphere as well as sealing against leakage of gases between the piston rod 34 and the engine head 26 and also to prevent gases from passing from one side of the piston 30 within the cylinder inner space 32 to another side of the piston 30 within the cylinder inner space 32, the engine 30 is provided with sealing rings 70.

The sealing rings 70 at both ends of an exhaust unit 48 have a similar construction. Each sealing ring 70, resting within a sealing ring housing 72 formed in the exhaust unit 48, comprises two exhaust rings 74 having a ring spacer 76 therebetween. The exhaust rings 74 are split rings and are formed such that they tend to squeeze inwardly in order to seal the gap between the exhaust ring 74 and the piston rod 34. The sealing rings 70 are stationary wherein the piston rods 34 slide therein.

A securing pin 78, connected to an exhaust cover 80, is directed to the gap formed between two edges of the split ring, thereby preventing the split ring, i.e., the exhaust ring 74, to rotate around the longitudinal axis A with respect to the piston rod 34. The exhaust ring 74 may be located at the end of the engine head 26 as described above and does not necessarily be installed at the exhaust chamber 50

Thus, by the aligner system 60 and the securing pins 78 it is assured that any relative rotational movement between the piston rods 34 and the split rings (i.e., the exhaust rings 74) is prevented, thus assuring unlimited free slide of the piston rods 34 relative to the sealing rings 70 without any risk that the exhaust slots 56 of the piston rods 34 may hit the gap between the split rings. When assembling the system, care must be taken to assure that the sealing rings 70 are stationary and that the piston rods 34 can freely slide through the sealing rings 70.

The sealing rings of the piston 30 have a similar construction to the described above with the difference that the split rings tend to extend outwardly, opposite to the described above, thus assuring that the sealing ring forcibly presses against the cylinder wall 33, thus assuring appropriate sealing of the piston 30 against the cylinder wall 33.

In order to ensure better sealing between the piston rod 34 and the engine head 26 at the exiting hole from the engine head 26, a special design is applied. According to the design, the compressed gases are forced to return into the cylinder inner space 32 instead of squeezing into the gap between the piston rod 34 and the engine head 26. The special design moves the clearance gap between the head port and the piston rod 34 from the apex of the parabola at the engine head combustion chamber to a lower point closer the cylinder top end. At the compression stroke the gases are forced to change direction backwards and not to be squeezed into the gap between the head port and the piston rod 34 and leak out.

Figure 17:
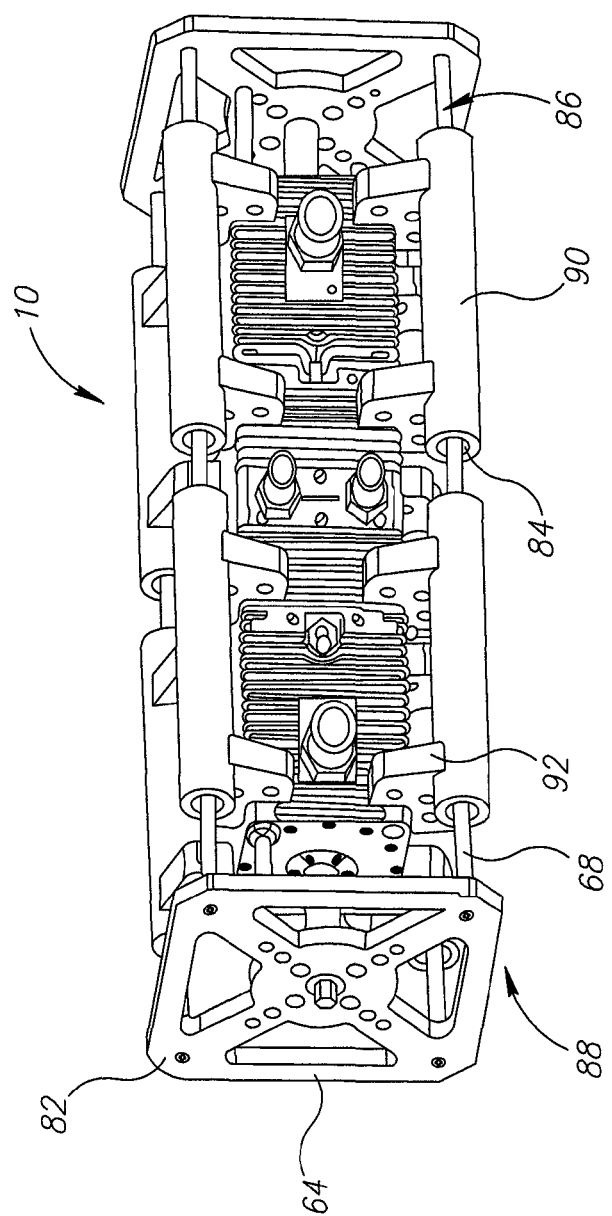
FIG. 17 is a perspective view of another embodiment of a free piston engine according to the present invention showing the connection of electricity generating unit to the engine.

FIG. 17 shows another embodiment of the engine 10 according to the present invention. As shown in FIG. 17, each of the connecting arms 64 has an X-shape, thus having four connecting arm edges 82. According to some embodiments, the four connecting arm edges 82 are connected therebetween, thus forming a generally square shape that encircles the X-shape connecting arms. The aligner rods 68 run along the entire length of the engine 10 and are connected, at both ends thereof, to the connecting arm edges 82.

Each of the aligner rods 68 is provided with a rotor assembly and coil windings 84 that form in practice a rotor 86 of an electric motor 88. Such a rotor 86 moves back and forth in a linear motion together with the connecting arms 64 that are connected to the piston rods 34 similar to a linear motor as known in the art.

Stator coils 90, connected to stator support brackets 92 that are located along and around the engine 10, are formed around each of the rotors 86. As shown, the electric motor 88 is formed around the engine 10, thus forming an efficient and compact structure. Furthermore, the stator coils 90 are arranged in a way that forms a new and unique "magnetic polarity array" of an electricity producing device.

According to the explained above, the engine according to the present invention is a linear, free piston, internal combustion engine that serves as a driving force to a power generator, by converting chemical energy stored in fuel to a useful mechanical energy. The engine can be applied to electrical propulsion, electrical accumulators, and other electrical consuming applications, or can be used to compress air or propel a propeller.

In order to show the advantages of the engine according to the present invention, a comparison is made with relation to a conventional four-cylinder engine.

| Prior Art | Present Invention |
| --- | --- |
| Power - about 80 hp | Power - estimated 80 hp |
| Total weight - average 70 kg | Total weight - about 14 Kg |
| Volume - average 1300 cc | Volume about 750 cc |
| Air pollution - within standards | Air pollution - minimal, measured value threshold |
| Complicated engine block | Simple engine block |
| Complicated engine head | Two engine heads (covers) |
| Four pistons | One double sided piston |
| Four piston rods | Two piston rods |
| Four atomizers | One or two atomizers |

Furthermore, the following part list, which exists in a conventional engine, is omitted from the engine according to the present invention:
Crank shaft, crank shaft bearings, crank shaft oil retainers, oil retainers housing for connecting rods bushings, connecting rods bearings, oil pump, lubrication system, oil sump, water pump, cam shaft, timing system, valves, valves guides, valves sealings, rockers, valves covering, counter shaft, upper oil retainers and sealings.

As can be seen from the above list and table, the engine of the present invention provides considerable advantages with respect to prior art engines, e.g., reduced number of parts, reduced weight, reduced air pollution, improved power to weight ratio, simple maintenance, improved mechanical reliability, reduced volume, and does not require internal oiling system.

Furthermore, since the piston according to the present invention involves multi functionality or being a "multi dimensional piston" by: (a) handling the combustion and power stroke, (b) serving as an inlet valve, (c) serving in the exhaust process, the piston may be regarded as being a "3D" piston.

In addition, since the piston 30 moves linearly along the longitudinal axis A, and, since the pressure applied on the piston 30 by the piston rod 34 is directed continuously along the same line, there are no side forces acting on the piston like in conventional engines where a base of the piston rod rotates around the crankshaft thereby applying alternating side forces on the piston, and, therefore, the piston according to the present invention may be regarded as a "traverse stressless action piston". Thus, due to the lack of sideways mechanical stresses, the need of an oiling system is avoided. This feature may also reduce the accumulated heat during the process and may reduce the need to supply cooling.

Thus, as acting along a single linear line and having the piston rod serving as an exhaust valve running inside the engine, i.e., an internal exhaust valve or "sliding valve", the engine according to the present invention may be regarded as an "internal combustion engine, with a linear 3D piston, self-scavenged and cooled, direct low pressure fuel injection system, aligned piston movement, and a running sliding valve.

Although the present invention has been described to a certain degree of particularity, it should be understood that various alterations and modifications could be made without departing from the spirit or scope of the invention as hereinafter claimed.

For example, the engine is not limited to have only one cylinder and it may have two or more cylinders.

The exhaust openings do not have to be equally peripherally distributed around the piston rod and they me arranged in a different array according to design needs.

The cavity of the piston rod do not have to extend along the entire length of the piston rod. Preferably, the cavity extends at least from an open end of the piston rod, which is remote from the piston, to the exhaust opening that is closest to the piston.

Figure 19:
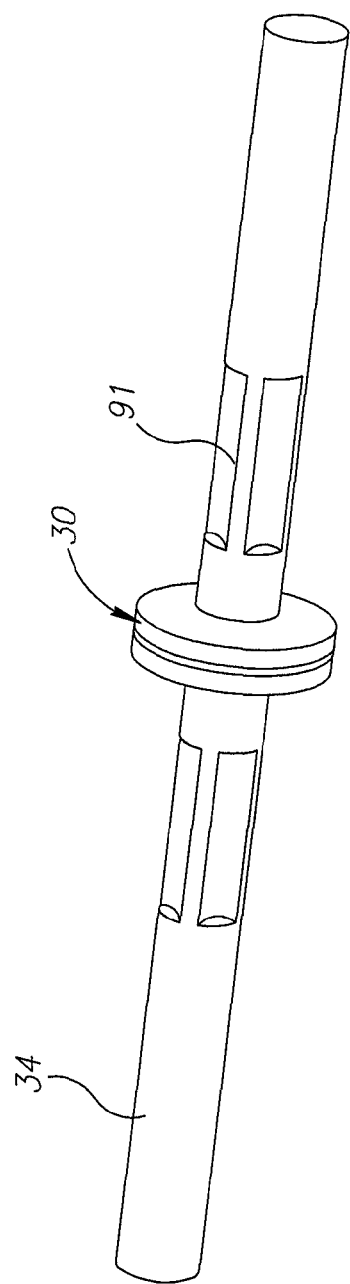
FIG. 19 is a perspective view of another embodiment of a piston rod according to the present invention.

The exhaust openings in the piston rod do not have to be formed as described. According to some embodiments, the piston rod is not formed with exhaust openings or with a cavity passing along the length of the piston rod. Alternatively, as shown in FIG. 19, the piston rod 34 is a solid rod and is provided on the surface thereof with longitudinally extending grooves 91. Since the piston 30, with the piston rods 34, move longitudinally along the cylinder inner space, the longitudinally extending grooves 91 are exposed, as required, to the cylinder inner space or to the exhaust chamber, thus performing the exhaust action.

The cooling fins do not have to be constructed as shown, i.e., have a disc-like shape or a square shape, and any other shape of cooling fins may be chosen according to construction and design needs.

The piston may be solid, without a through bore, as described above, where each of the piston rods is, independently or otherwise, connected to its side of the piston. Alternatively, the piston may be provided with a through bore in order to connect therethrough each of the piston rods to each other. However, it should be clarified that no gases may flow from one side of the piston to another side of the piston through the piston rods.

The unique design of the central air feed filling the cylinder with pre-charged fresh air allows to apply traditional valves, one or more on each side of the cylinder head. The valves are closed by a spring and are opened by a mechanical mechanism. Alternatively, they may be electrically operated. The valves can open immediately after the work stroke ends its efficient move and remain open until the piston moves to the opposite end and back to direction of compression stroke. At the same time, the air entering the cylinder fills the increased volume of the cylinder as the piston moves to the opposite direction. The use of traditional valves or ports requires to apply small exhaust units at the ends of the engine head to collect and prevent any leaking gases from being escaped to the atmosphere.

The small exhaust chamber is a self-contained unit or part of the engine head. Hot gases are trapped in the exhaust chamber and are directed to the exhaust manifold for aftertreatment.

Figure 8:
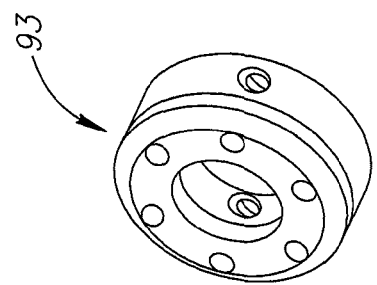
FIG. 8 is a perspective view of a modified version of the engine head when valves are used.
Figure 7:
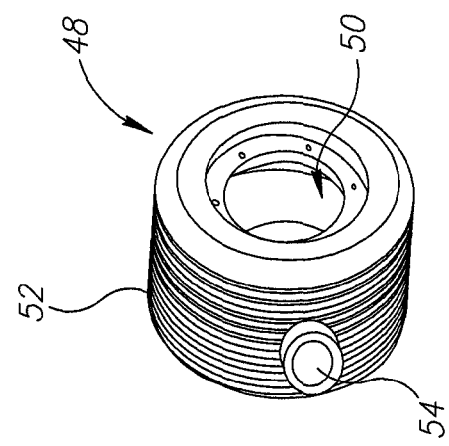
FIG. 7 is a perspective view of an exhaust unit of the engine of FIG. 1.
Figure 10:
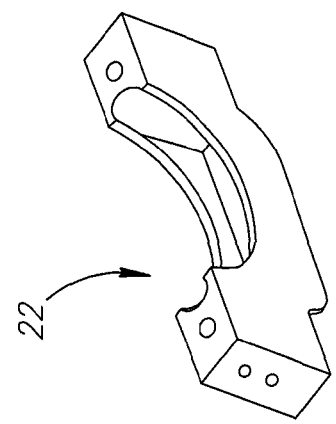
FIG. 10 is a perspective view of a lower portion of the intake manifold of the engine of FIG. 1.
Figure 9:
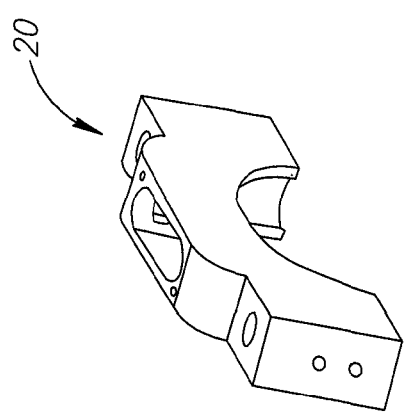
FIG. 9 is a perspective view of an upper portion of the intake manifold of the engine of FIG. 1.

FIG. 8 shows a modified version of an engine head 93 when valves are used.

Figure 18:
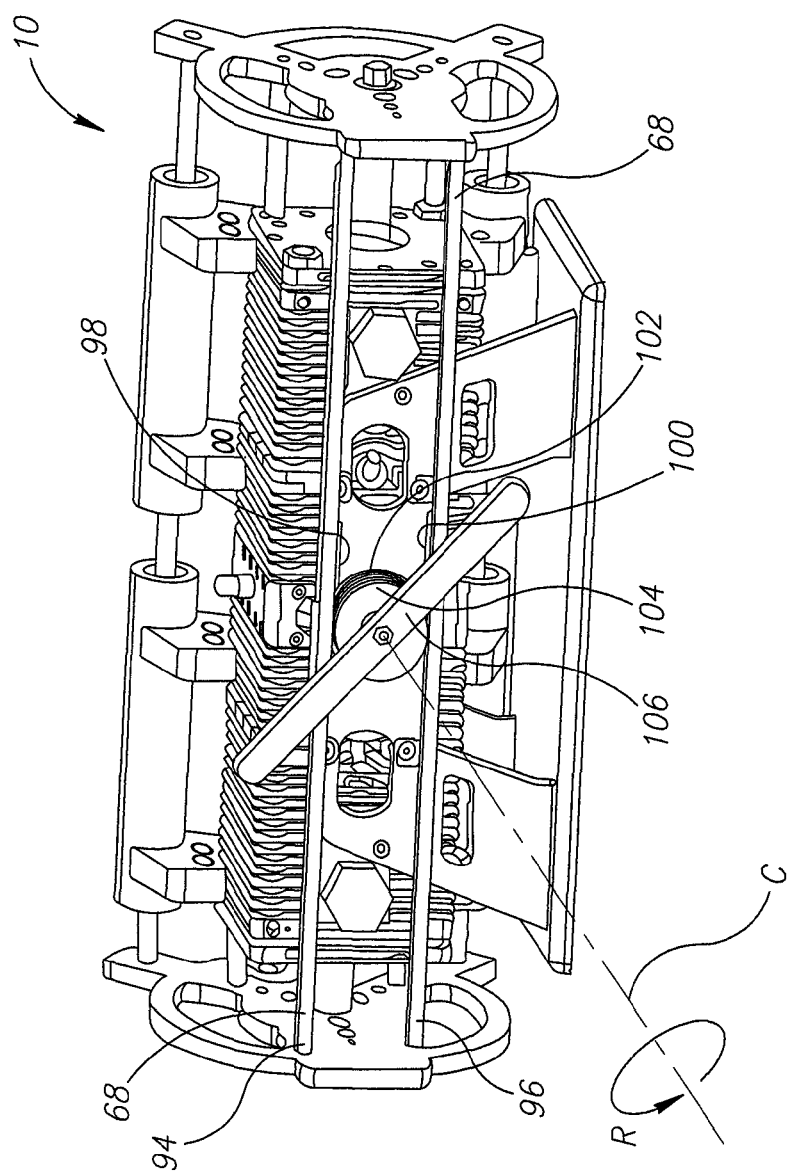
FIG. 18 is a perspective view of another embodiment of a free piston engine according to the present invention equipped with a mechanism for transforming linear movement to rotational movement.

According to some embodiments (see FIG. 18), the linear movement of two adjacent aligner rods 68, e.g., an upper aligner rod 94 and a lower aligner rod 96 (and hence, the linear movement of the engine 10) is used for producing a rotational movement R around an output axis C. The upper aligner rod 94 is provided, in a central portion thereof, with an upper rack 98, and the lower aligner rod 96 is provided, in a central portion thereof, with a lower rack 100. The upper rack 98 is facing the lower rack 100 and each of them is engaged with a different pinion. The upper rack 98 is engaged with a first pinion 102 and the lower rack 100 is engaged with a second pinion 104 that is parallel to the first pinion 102 and separated therefrom.

The first pinion 102 and the second pinion 104 are assembled on a common axis, i.e., the output axis C. Each of the pinions is provided with a uni-directional bearing, being a mechanical or electrical bearing. In the embodiment shown, the first pinion 102 rotates anticlockwise when the upper aligner rod 94 moves to the left side, and remains idle when the upper aligner rod 94 moves to the right side. Likewise, the second pinion 104 rotates anticlockwise when the lower aligner rod 96 moves to the right side, and remains idle when the lower aligner rod 96 moves to the left side.

Thus, when the piston of the engine 10 linearly moves toward a given direction, together with the aligner rods 68, only one pinion rotates while the other pinion remains idle. When the piston of the engine 10 linearly moves toward the opposite direction, together with the aligner rods 68, the other pinion rotates. Thus, by alternatingly rotated by the aligner rods, each pinion by a different direction of the aligner rods, the pinions rotate the mutual output axis C in a single direction only (being anticlockwise, as arbitrary shown in FIG. 17, or, at the opposite direction, i.e., clockwise). Therefore, the engine of the present invention may be used for producing a rotational movement for any known mechanical application, e.g., a propeller 106 of an aircraft, an electric producing generator, and the like. Furthermore, the engine of the present invention may be used for compressing liquids or gases.

The rotational movement R is established substantially around the output axis C that is perpendicular to the longitudinal axis A of the engine 10.

The engine is not limited to use fuel that is ignited by means of a spark plug, and, if required, the engine may use diesel self-igniting fuel. In that case, the spark plug is omitted from the engine.

In some embodiments, in order to prevent burned gas leakage the engine comprises a transient chamber that is connected to the exhaust manifold.

In some embodiments, the exhaust openings are near the inlet openings.

The invention claimed is:

1. An internal combustion engine configured to generate a linear reciprocating movement of an output shaft along a longitudinal axis, comprising:
  a double sided cylinder bounded by an engine head at each side thereof;
  an exhaust unit positioned at each side of the cylinder and connected to one corresponding engine head;
  a double-sided piston positioned within an inner space of the cylinder and freely sliding with respect to the cylinder along the longitudinal axis; and
  two piston rods aligned with the longitudinal axis, each piston rod connected at a different side of the piston; wherein:
    each of the piston rods comprises a plurality of exhaust openings, and
    each of the piston rods is provided with a cavity extending at least from an open end of the piston rod, said open end being remote from the piston, to an exhaust opening, said exhaust opening being closer to the piston than the open end.

2. The engine according to claim 1, wherein:
the exhaust openings comprise at least one of holes, longitudinal slots, or grooves.

3. The engine according to claim 1, wherein:
the exhaust openings form an integral part of the piston rods.

4. The engine according to claim 1, wherein:
each of the piston rods is a sliding valve.

5. The engine according to claim 1, wherein:
the piston is configured within the cylinder such that a sliding movement of the piston within the cylinder creates an inlet valve permitting the intake of air and creates an exhaust valve permitting burned gases to be expelled from the cylinder.

6. The engine according to claim 1, wherein:
the piston is symmetrical with respect to a median plane thereof.

7. The engine according to claim 1, wherein:
the engine operates through an Aquarius cycle, the Aquarius cycle comprising the steps of:
(a) work, (b) exhaust, (c) scavenging, (d) gas boost, and (e) compression.

8. The engine according to claim 1, wherein
the exhaust openings are arranged in at least one group.

9. The engine according to claim 1, wherein:
the cylinder further comprises one or more inlet openings configured substantially in the center of the cylinder.

10. The engine according to claim 1, wherein:
the cylinder is configured to permit a continuous flow of pre-charged air therethrough.

11. The engine according to claim 10, wherein:
the cylinder further comprises an inner cylinder wall and wherein the continuous flow of air scavenges the cylinder from burned gases, cools the cylinder wall and the piston, and enriches the burned gases without depending on a position of the piston.

12. The engine according to claim 1, wherein:
burned gases exhaust the cylinder through the piston rods.

13. The engine according to claim 1, wherein:
the piston is a multifunctional piston or a traverse stressless action piston.

14. The engine according to claim 1, wherein:
the engine further comprises a transient chamber connected to an exhaust manifold of the exhaust unit to prevent leakage of burned gases.

15. The engine according to claim 1, wherein:
the engine further comprises sealing rings for sealing between the piston rods and the engine heads and between the piston rods and the exhaust units, and wherein:
the sealing rings are stationary and the piston rods slide therein and with respect thereto.

16. The engine according to claim 15, wherein:
each of the sealing rings comprises split rings that close inwardly against the piston rod.

17. The engine according to claim 1, wherein:
the engine further comprises an aligner system configured to prevent the piston from rotating around the longitudinal axis.

18. An internal combustion engine configured to generate a linear reciprocating movement of an output shaft along a longitudinal axis, comprising:
  a double sided cylinder bounded by an engine head at each side thereof;
  an exhaust unit positioned at each side of the cylinder and connected to one corresponding engine head;
  a double-sided piston positioned within an inner space of the cylinder and freely sliding with respect to the cylinder along the longitudinal axis;
  two piston rods aligned with the longitudinal axis, each piston rod connected at a different side of the piston; and
  an aligner system configured to prevent the piston from rotating around the longitudinal axis,
  wherein:
    each of the piston rods comprises a plurality of exhaust openings;
    the aligner system comprises aligner rods;
    the aligner rods comprise coil winding; and
    the engine further comprises an electric motor having stator coils configured to generate electric power, said stator coils being energized by a linear back and forth movement of the aligner rods through the stator coils.

19. An internal combustion engine configured to generate a linear reciprocating movement of an output shaft along a longitudinal axis, comprising:
  a double sided cylinder bounded by an engine head at each side thereof;
  an exhaust unit positioned at each side of the cylinder and connected to one corresponding engine head;
  a double-sided piston positioned within an inner space of the cylinder and freely sliding with respect to the cylinder along the longitudinal axis;
  two piston rods aligned with the longitudinal axis, each piston rod connected at a different side of the piston; and
  an aligner system configured to prevent the piston from rotating around the longitudinal axis,
  wherein:
    each of the piston rods comprises a plurality of exhaust openings;
    the aligner system comprises aligner rods, and the engine further comprises a system configured to transform a linear movement to a rotational movement; and
    the system comprises:

a first pinion rotated by a first rack that is connected to a first aligner rod of the aligner rods, the first pinion being configured to rotate in a single direction;

a second pinion rotated by a second rack that is connected to a second aligner rod of the aligner rods, said second aligner rod being adjacent to the first aligner rod, the second pinion being configured to rotate the single direction; and wherein the first pinion and the second pinion are aligned and rotate around an output axis.

* * * * *